United States Patent

Salle et al.

[11] Patent Number: 6,151,080
[45] Date of Patent: Nov. 21, 2000

[54] SECAM CHROMINANCE SIGNAL DEMODULATOR WITH TWO RED-BLUE CHANNELS AND A SINGLE OSCILLATOR

[75] Inventors: Didier Salle, Grenoble; Gérard Bret, Echirolles, both of France

[73] Assignee: STMicroelectronics S.A., Gentilly, France

[21] Appl. No.: 09/288,349

[22] Filed: Apr. 8, 1999

[30] Foreign Application Priority Data

Apr. 24, 1998 [FR] France .................................. 98 05187

[51] Int. Cl.[7] .......................................... H04N 9/66
[52] U.S. Cl. .................................... 348/638; 348/727
[58] Field of Search ................................... 348/638, 727, 348/726; 329/318, 319, 325; H04N 9/66

[56] References Cited

U.S. PATENT DOCUMENTS 4,410,856  10/1983  van Zanten ........................... 329/122
4,963,831  10/1990  Stuivenwold et al. ................. 348/638
5,726,714   3/1998  Maldonado ........................... 348/638
5,838,395  11/1998  Brilka ................................ 348/727

FOREIGN PATENT DOCUMENTS 0 222 653 A1  10/1986  European Pat. Off. .
09065356       3/1997  Japan .

Primary Examiner—Victor R. Kostak
Attorney, Agent, or Firm—Theodore E. Galanthay; Allen, Dyer, Doppelt, Milbrath & Gilchrist, P.A.

[57] ABSTRACT

The SECAM chrominance signal demodulator includes an oscillator with a controlled frequency, a phase comparator with a first input connected to an oscillator output, a second input to receive a chrominance signal, and an output connected to an input loop of the oscillator. The demodulator further includes a fixed current source, also connected to the loop input, a current mirror to copy a current equal to the sum of the fixed current and a comparator output current in the output branches comprising first and second calibration resistors respectively, in series with a common resistor. Output voltages corresponding to the red and blue components of the chrominance signal are measured at the terminals of the calibration resistors respectively. The demodulator is used in television sets, for example.

28 Claims, 2 Drawing Sheets

SECAM CHROMINANCE SIGNAL DEMODULATOR WITH TWO RED-BLUE CHANNELS AND A SINGLE OSCILLATOR

FIELD OF THE INVENTION

This invention relates to a chrominance signal demodulator. The invention can be used, for example, in the television sets or video signal receivers.

BACKGROUND OF THE INVENTION

According to the SECAM standard, chrominance information in a video signal is transmitted by frequency modulation of the chrominance sub-carriers. The video signal comprises a sequence of lines forming a picture. Among these lines, two successive lines contain information corresponding to the red component and then information corresponding to the blue component of a three-color picture.

The sub-carriers on which the information for the red and blue are coded are centered on distinct frequencies, which are $F_{OR}$=4.406 MHZ for the red and $F_{OB}$=4.250 MHZ for the blue. Chrominance signal demodulators are used to extract information about the red and blue components from the signal, and more precisely from the frequency modulated sub-carriers.

FIG. 1 schematically illustrates the operating principle of a SECAM chrominance signal demodulator in a simplified manner. The demodulator in FIG. 1 can be used to demodulate lines containing information related to the red or blue. The demodulator includes an oscillator 10 with a controlled frequency and a phase comparator 20. For the purposes of this invention, a phase comparator means a device that has two signal inputs and is capable of outputting a current or a voltage proportional to a phase difference between the two input signals.

The oscillator 10 is a voltage controlled oscillator (VCO) comprising two inputs 12, 14 called the loop input and the adjustment input respectively, and an output 16 that outputs a signal at a frequency that depends on the voltages applied at the loop and adjustment inputs. The input to the loop 12 of oscillator 10 is connected to an output 26 of the phase comparator 20, while the output 16 from oscillator 10 is connected to a first input 22 of the phase comparator. A second input 24 of the phase comparator is connected to a two-way switch 28 that selectively connects the second input either to a chrominance channel 30 that transmits the chrominance signal, or to a quartz external reference oscillator 32 that outputs a signal at a reference frequency.

The phase comparator associated with the oscillator forms a PLL (Phase Locked Loop) demodulation loop. When the two-way switch 28 connects the second input 24 of the phase comparator to the chrominance channel 30, the demodulator outputs a voltage V proportional to the frequency of the chrominance signal F.

The voltage V is used as information representative of the color component (blue or red) corresponding to the signal present on channel 30. The voltage V is such that V=kFU, where k is a proportionality coefficient and U is a voltage applied to the adjustment input 14 of the oscillator. The frequency of the output signal from oscillator 10 must be determined very precisely and must remain stable to control the precision of the demodulator output voltage V so that the equipment having the demodulator will be capable of high fidelity reproduction of the colors.

Consequently, the oscillator 10 must be frequency matched to a reference frequency denoted $F_{ref}$, supplied by the external oscillator 32. Oscillator 10 is matched by connecting the second input 24 of the phase comparator to the external reference oscillator 32. During the oscillator matching phase, an on-off switch 40 in an adjustment circuit 42 is closed. The matching phase may then be started, for example, by information that cancels out the video signal frame used to control the two-way switch 28 and the on-off switch 40.

This circuit comprises a transconductor 44, one input of which is connected to the input of oscillator loop 12, and the other input is connected to a reference voltage source 46 outputting a voltage $V_{ref}$. When the voltage at the input to the oscillator loop 10 is not equal to the reference voltage $V_{ref}$, the transconductor outputs a current (positive or negative) that charges or discharges a memory capacitor 48. Thus, the voltage U of the memory capacitor 48 applied to the oscillator adjustment input 14 is modified to adjust the oscillator output voltage to a value such that the oscillator loop input voltage becomes equal to $V_{ref}$.

During a demodulation phase, the on-off switch 40 is open and the adjusted voltage U is maintained at the terminals of capacitor 48.

Thus $V_{ref}=kF_{ref}U$ let $$U = \frac{V_{ref}}{kF_{ref}}$$

We can therefore write:

$$V = kFU = kF\frac{V_{ref}}{kF_{ref}} = \frac{V_{ref}}{F_{ref}}F = HF$$

where H is the demodulation gain that is very precisely known as the ratio of the reference voltage to the reference frequency.

As already mentioned, the SECAM chrominance signal for successive lines of a picture is alternatively frequency modulated around the central frequencies with different values. A line received with central frequency FOR and a modulation factor corresponding to a first component of color (R-Y) is followed by a line with central frequency $F_{OB}$, and a different modulation factor corresponding to another color component (B-Y). Thus a single demodulator like that described above is capable of demodulating the signal from two successive lines.

Therefore, a SECAM chrominance decoder must comprise two oscillators matched differently, as a function of two possible central frequencies $F_{OB}$ and $F_{OR}$ respectively, each having a phase comparator (the $V_{ref}$ and $F_{ref}$ generators may be common). Increasing the number of demodulators inhibits miniaturization requirements for SECAM signal decoders. Furthermore, the use of the two demodulators should be avoided because the memory capacitor is a component that occupies a very large area on an integrated circuit.

SUMMARY OF THE INVENTION

The object of the invention is to provide a SECAM chrominance signal demodulator with a single oscillator capable of demodulating line signals for a first color (red) and line signals for a second color (blue) at the same time, with different central frequencies.

Another object is to provide this type of demodulator for a video decoder in the form of a highly integrated circuit.

Another object is to provide a demodulator for which there is no need to match the oscillator on different oscillation frequencies as a function of the central modulation frequency of the signals to be decoded.

Finally, another object of the invention is to provide an inexpensive demodulator, the components of which occupy only a small space on an integrated circuit substrate.

In order to achieve these objects, the demodulating device for a SECAM chrominance signal includes a controlled frequency oscillator with a first input as the loop input, a second input as the adjustment input, and an output. The device also includes a phase comparator with a first input connected to the oscillator output, a second signal input to receive a SECAM chrominance signal with a modulation frequency, and a current output directly or indirectly connected to the input of the oscillator loop.

The demodulating device according to the invention also includes a fixed current source, also connected to the oscillator loop input, and a current mirror to copy a current equal to the sum of the fixed current and the current at the phase comparator output. This current is copied into a first and second output branch comprising first and second calibration resistors respectively connected in series with a common resistor and a common current generator outputting a current equal to twice the fixed current. The value of the first calibration resistor is chosen such that a first output voltage measured at the terminals of the first calibration resistor in series with the common resistor is equal to a first determined value, for example zero, when the modulation frequency of the signal applied to the phase comparator signal input is equal to a central modulation frequency corresponding to a first color. The value of the second calibration resistor is chosen such that a second output voltage measured at the terminals of the second calibration resistor in series with the common resistor is equal to a second determined value, for example zero, when the modulation frequency of the signal applied to the phase comparator signal input is equal to a central modulation frequency corresponding to a second color.

Due to the two output branches, the line signals corresponding to different colors can be demodulated using a single oscillator, without adjusting the oscillator frequency. In particular the first and second colors may be blue and red, with central modulation frequencies of 4.25 MHz and 4.406 MHZ respectively. Although there is no need to adapt the oscillator frequency to the frequency of the signals to be demodulated, this can be done to enable better fidelity of color reproduction, and to periodically match the oscillator with respect to a reference frequency.

Consequently, the device may be equipped with an external reference oscillator that can be connected to the input of the comparator signal to output a signal to this input at a reference frequency. The reference frequency may be different from the first and second color modulation frequencies. The reference frequency $F_{ref}$ is different from the central frequencies $F_{OR}$ and $F_{OB}$, and may, for example, be equal to 4.43 MHZ.

The oscillator may be matched by an adjustment circuit connected to the oscillator adjustment input to output an adjustment value to the adjustment input such that the voltage at the terminals of the common resistor is equal to zero, when the frequency of a signal applied to the comparator signal input is equal to the reference frequency. The adjustment value may be a current for a current controlled oscillator (CCO) or a voltage for a voltage controlled oscillator (VCO). The oscillator may be matched after every reception of a line, or preferably after each frame containing a set of lines forming a half picture.

To select a normal demodulation operating mode or a matching mode, the device may comprise a two-way switch to selectively connect the phase comparator signal input either to a video signal chrominance channel, or to the external reference oscillator. An on-off switch initializing the adjustment circuit is also provided. This on-off switch is closed when the external oscillator is connected to the phase comparator signal input, and is open when the chrominance channel is connected to the phase comparator signal input. The two-way switch and the on-off switch are controlled, for example, by a frame synchronization signal detector.

According to one specific embodiment of the adjustment circuit, the circuit may comprise a first transconductor amplifier to output a current proportional to the voltage at the terminals of the common resistor to fix a capacitor charging voltage when the initialization on-off switch is closed. A second transconductor amplifier is connected between the capacitor and the oscillator adjustment input to output an adjustment current to the oscillator proportional to the capacitor charging voltage.

BRIEF DESCRIPTION OF THE DRAWINGS

Other characteristics and advantages of this invention will become clearer from the following description with reference to the figures in the attached drawings. This description is given for illustrative purposes only and is in no way restrictive.

DETAILED DESCRIPTION OF THE PREFERRED EMBODIMENTS

Figure 1:
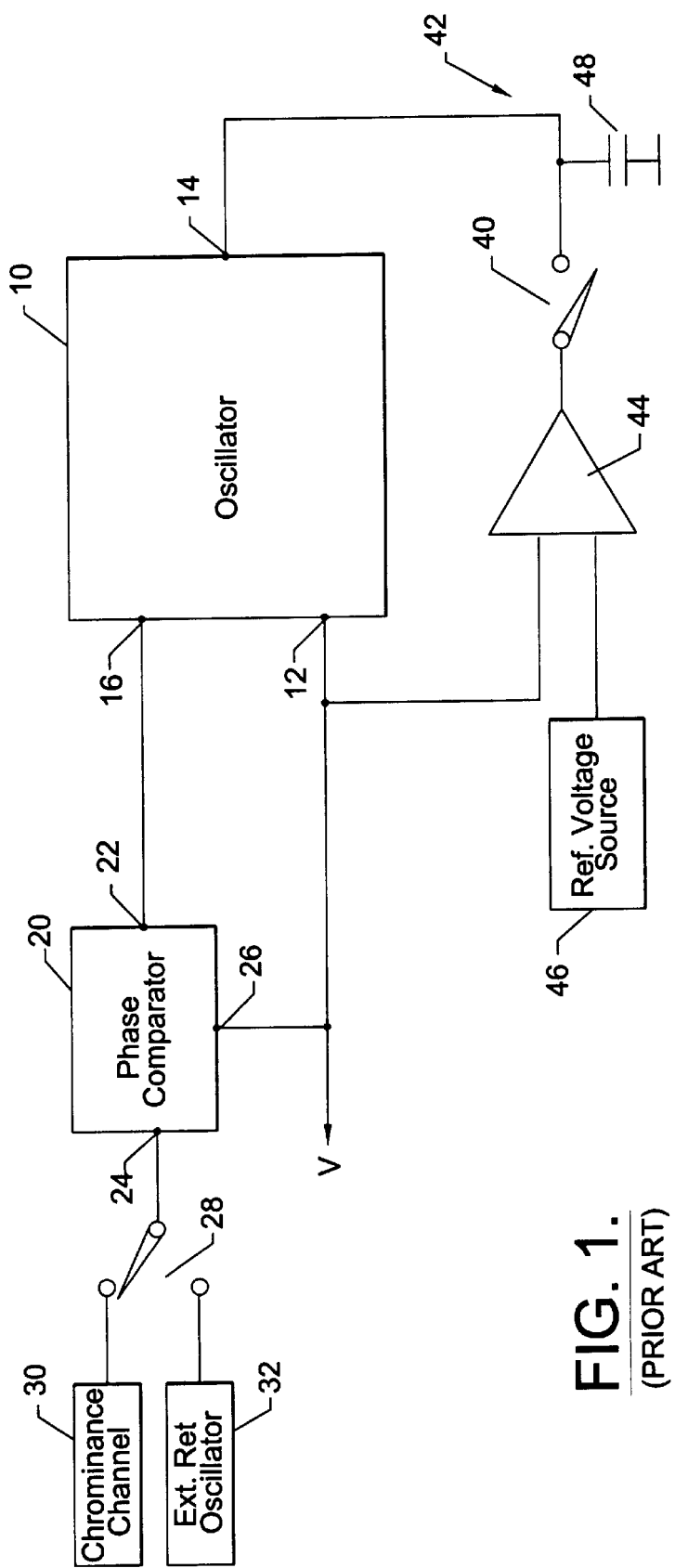
FIG. 1, already described, is a simplified block diagram of a prior art demodulator.
Figure 2:
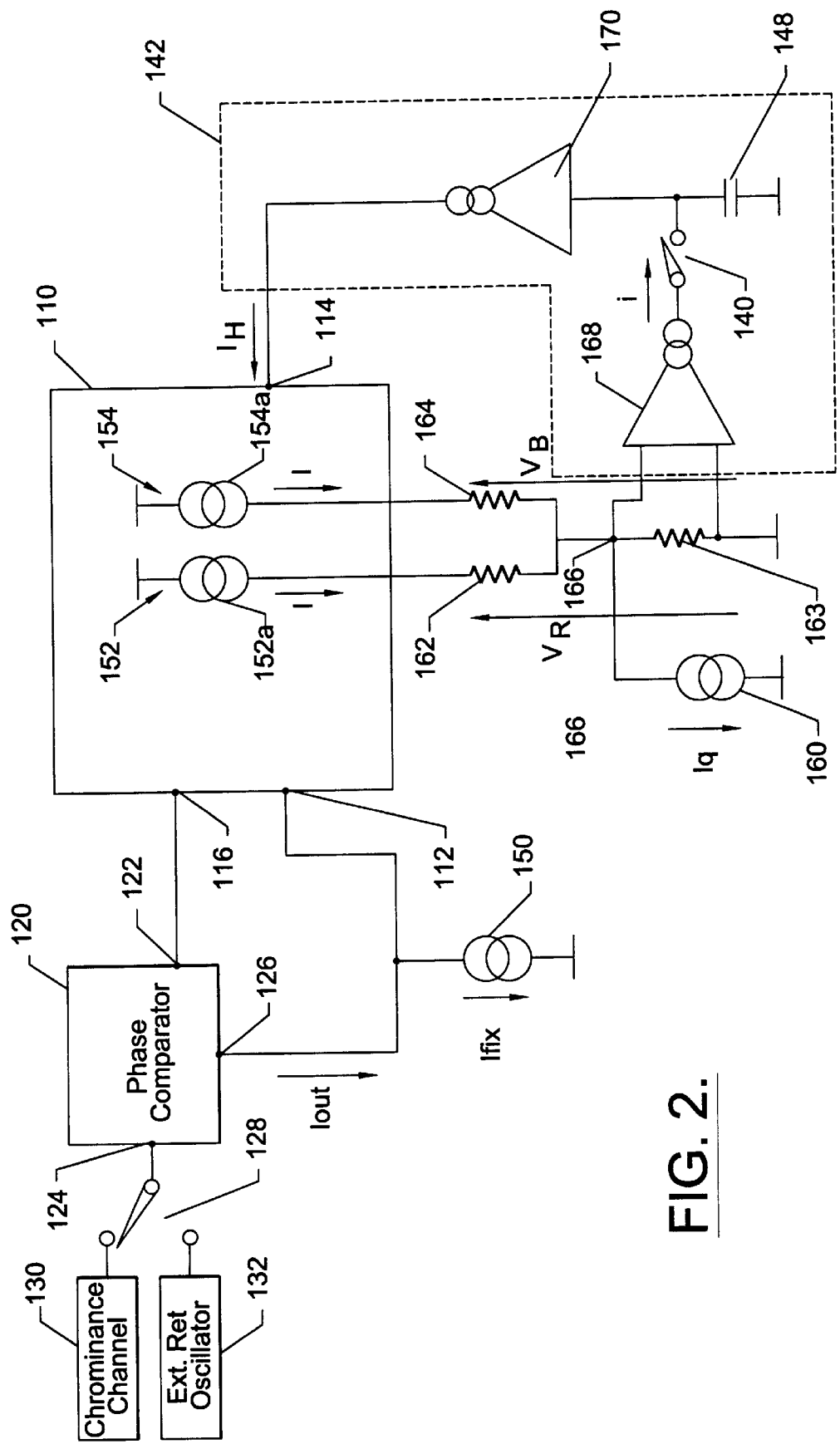
FIG. 2, described below, is a simplified diagram of a demodulating device according to a specific embodiment of the invention.

Parts of FIG. 2 that are identical, similar or equivalent to parts of FIG. 1, already described, have the same reference numerals as in FIG. 1 plus 100. Thus, the previous description is applicable.

The device in FIG. 2 includes an oscillator 110 with a controlled frequency and a phase comparator 120. In the following description, the oscillator 110 is considered to be a current controlled oscillator (CCO) comprising a loop input 112 and an adjustment input 114. Thus these inputs are current inputs. However, the oscillator could be replaced by a voltage controlled oscillator (VCO) in which the two inputs are replaced by voltage inputs.

The output of the oscillator is marked by reference numeral 116. The phase comparator 120 has a first input 122 connected to the oscillator output 116 and a second input 124 that can selectively receive a chrominance signal or a reference signal. A current output 126 from comparator 120 is connected to the input to loop 112 of oscillator 110. If the oscillator is a CCO, it may be connected directly to the loop input. If the oscillator is a VCO, it may be connected through a current to a voltage converter, for example, a resistor.

A two-way switch 128 selectively connects the second input 124 of the phase comparator either to a signal channel 130 that outputs SECAM chrominance signals that can be modulated indifferently with a central frequency $F_{OR}$ or $F_{OB}$, or to a reference signal generator 132 that outputs a signal at a reference frequency $F_{ref}$. A current source 150 outputting a fixed DC current denoted $I_{fix}$ is also connected to the oscillator loop input 112, in common with the comparator output.

The device in FIG. 2 according to the invention comprises a current mirror capable of copying a current $I=I_{out}+I_{fix}$, equal to the sum of an output current $I_{out}$ from the phase comparator and the fixed DC current $I_{fix}$, in the two output branches 152, 154. The current $I_{out}$ may be positive or negative. Output branches 152, 154 comprise current generators 152a, 154a respectively, each outputting a current I equal to $I_{out}+I_{fix}$. The pilot branch of the current mirror is not shown for simplification. The output branches may be included in circuits forming the oscillator, or may be separated from it.

The current generator for the first output branch 152 is connected to a reference potential, for example the ground, through a first calibration resistor 162 with value $R_R$ and a common resistor 163 with value $R_Q$ connected in series. The current generator in the second output branch 154 is connected to the reference potential through a second calibration resistor 164 with value $R_B$, also in series with the common resistor 163.

A current generator 160 is connected to a node 166 corresponding to a terminal of the common resistor connected to the first and second resistors 162, 164. The current generator 160 mentioned above forms a current mirror with the current generator 150 connected to the phase detector output and outputs a current $I_q$ such that $I_q=2I_{fix}$. The common resistor 163 is also connected to an adjustment loop 142 of oscillator 110. An on-off switch 140 closes the adjustment loop 142 when two-way switch 128 is connected to the external reference oscillator 132 that outputs a signal with frequency $F_{ref}$.

The adjustment loop 142 then supplies a current denoted $I_H$ at the adjustment input 114 of oscillator 110. This current modifies the oscillation frequency and therefore modifies the phase comparator output current $I_{out}$ such that the current passing through the common resistor 163 is zero, in other words $2(I_{out}+I_{fix})-2I_{fix}=0$, i.e. $I_{out}=0$. Loop 142 comprises a first transconductor amplifier 168, the input terminals of which are connected to the terminals of the common resistor 163. The output from the transconductor amplifier outputs a positive or negative current i that charges or discharges a memory capacitor 148.

The memory capacitor 148 is connected to a second transconductor amplifier 170 that outputs the current $I_H$ to the oscillator input 114, this current being proportional to a voltage $V_{cm}$ at the terminals of memory capacitor 148. $I_H=gmV_{cm}$ where gm is the trans-conductance factor of the second amplifier 170.

When on-off switch 140 is open, in other words during a demodulation phase, the voltage $V_{cm}$ is stored in the capacitor and the current $I_H$ is kept approximately unchanged until a next adjustment phase. The output from the demodulating device is composed of voltages $V_R$ and $V_B$ measured on the output branches. More precisely, $V_R$ is measured at the terminals of this assembly formed by the first calibration resistor 162 in series with the common resistor 163 and $V_B$ is measured at the terminals of the assembly formed by the second calibration resistor 164 in series with the common resistor 163.

The oscillation frequency $F_0$ of the oscillator 110 is such that:

$$F_0 = \frac{I_{in}}{kI_H} \quad (1)$$

where $I_{in}$ is the current received through the loop input 112, in other words $I_{out}+I_{fix}$, and k is a proportionality factor related to the oscillator.

During an adjustment phase, the current $I_H$ is adjusted such that $F_0=F_{ref}$ and $I_{out}=0$ (such that $I_q=2I_{fix}$), thus:

$$F_{ref} = \frac{I_{in}}{kI_H} = \frac{I_{fix}}{kI_H} \quad (2)$$

Referring to equation (1) above, the following can be verified when the frequency of the comparator input signal is $F_{OR}$:

$$F_{OR} = \frac{I_{fix} + I_{out}(F_{OR})}{kI_H} \quad (3)$$

and the following can be verified when the frequency of the input signal is $F_{OB}$:

$$F_{OB} = \frac{I_{fix} + I_{out}(F_{OB})}{kI_H} \quad (4)$$

The values $R_R$ and $R_B$ of the first and second calibration resistors are chosen such that the output voltages $V_R$ and $V_B$ are zero when the frequency of the signal applied to the second input 124 of the phase comparator is equal to $F_{OR}$ and $F_{OB}$ respectively.

Considering the above equations, resistances $R_R$ and $R_B$ are chosen such that:

$$R_R = 2R_Q \frac{F_{ref} + F_{OR}}{F_{OR}} \quad \text{and}$$

$$R_R = 2R_Q \frac{F_{ref} + F_{OR}}{F_{OB}}$$

After adjusting the oscillator frequency, a frequency difference $\Delta F$ between the frequency $F_{in}$ of the received chrominance video signal and the oscillator frequency $F_0$ (equal to $F_{ref}$) causes an output current $I_{out}$ such that:

$$I_{out} = \frac{I_{fix}}{F_{ref}} \Delta F$$

where $$\frac{I_{fix}}{I_{ref}}$$

is the gain of the demodulator.

The variation of the current $I_{out}$ causes a variation of the voltages $V_R$ and $V_B$ such that:

$$V_R = I_{out}(R_R + 2_{RQ})$$

$$V_B = I_{out}(R_B + 2_{RQ})$$

With this device, it is thus possible to demodulate signals for which the frequency is centered on distinct frequencies $F_{OR}$ and $F_{OB}$, without changing the frequency at which the oscillator is matched.

For successive lines in the chrominance signal (red and blue), the voltages $V_R$ and $V_B$ are accepted successively as voltages representing the color component.

That which is claimed is:

1. A demodulator for a chrominance signal, the demodulator comprising:

a controlled frequency oscillator with a loop input, an adjustment input, and an output;

a phase comparator with a first input connected to the oscillator output, a second input to receive a chrominance signal with a modulation frequency, and a current output operatively connected to the loop input of the oscillator;

a fixed current source, also connected to the loop input of the oscillator, the fixed current source providing a fixed current;

first and second output branches which comprise first and second calibration resistors respectively in series with a common resistor and a common current generator outputting a current equal to twice the fixed current; and a current mirror to copy a current equal to the sum of the fixed current and a current at the current output of the phase comparator, into the first and second output branches;

a value of the first calibration resistor being such that a first output voltage measured across the first calibration resistor is equal to a first value determined when the modulation frequency of the signal applied to the second input of the phase comparator is equal to a central modulation frequency corresponding to a first color, and a value of the second calibration resistor being such that a second output voltage measured across the second calibration resistor is equal to a second value determined when the modulation frequency of the signal applied to the second input of the phase comparator is equal to a central modulation frequency corresponding to a second color.

2. A demodulator according to claim 1, wherein the first and second values are zero.

3. A demodulator according to claim 1, wherein the first and second colors are blue and red respectively, with central modulation frequencies of 4.25 MHZ and 4.406 MHZ respectively.

4. A demodulator according to claim 1, further comprising a reference oscillator to be connected to the second input of the phase comparator to output a signal to the second input at a reference frequency, the reference frequency being different from modulation frequencies of the first and second colors.

5. A demodulator according to claim 4, wherein the reference frequency is approximately 4.4 MHZ.

6. A demodulator according to claim 4 further comprising an adjustment circuit connected to the adjustment input of the oscillator to output an adjustment value to the adjustment input such that the voltage across the common resistor is zero when the modulation frequency of a signal applied to the second input of the phase comparator is equal to the reference frequency.

7. A demodulator according to claim 6, wherein the adjustment value is an adjustment current or an adjustment voltage.

8. A demodulator according to claim 6, further comprising:

a chrominance channel;

a switch to connect the second input of the phase comparator to the chrominance channel or to the reference oscillator; and an adjustment circuit initialization switch, the switch being closed when the reference oscillator is connected to the second input of the phase comparator, and the switch being open when the chrominance channel is connected to the second input of the phase comparator.

9. A demodulator according to claim 8, wherein the adjustment circuit comprises:

a capacitor; and a first transconductor amplifier outputting a current proportional to a voltage across the common resistor to fix a voltage for the capacitor when the initialization switch is closed, and a second transconductor amplifier connected between the capacitor and the adjustment input of the oscillator to output an adjustment current to the oscillator proportional to the voltage of the capacitor.

10. A demodulator according to claim 1, wherein the demodulator is an integrated circuit.

11. A video signal receiver comprising:

a demodulator for a chrominance signal, the demodulator comprising a controlled frequency oscillator with a loop input, an adjustment input, and an output;

a phase comparator with a first input connected to the oscillator output, a second input to receive a chrominance signal with a modulation frequency, and a current output operatively connected to the loop input of the oscillator;

a fixed current source, also connected to the loop input of the oscillator, the fixed current source providing a fixed current;

first and second output branches which comprise first and second calibration resistors respectively in series with a common resistor and a common current generator outputting a current equal to twice the fixed current; and a current mirror to copy a current equal to the sum of the fixed current and a current at the current output of the phase comparator, into the first and second output branches;

a value of the first calibration resistor being such that a first output voltage measured across the first calibration resistor is equal to a first value determined when the modulation frequency of the signal applied to the second input of the phase comparator is equal to a central modulation frequency corresponding to a first color, and a value of the second calibration resistor being such that a second output voltage measured across the second calibration resistor is equal to a second value determined when the modulation frequency of the signal applied to the second input of the phase comparator is equal to a central modulation frequency corresponding to a second color;

a reference oscillator to be connected to the second input of the phase comparator to output a signal to the second input at a reference frequency, the reference frequency being different from modulation frequencies of the first and second colors;

a chrominance channel to be connected to the second input of the phase comparator to transmit a chrominance signal; and a switch to connect the second input of the phase comparator to the chrominance channel or to the external reference oscillator.

12. A video signal receiver according to claim 11, wherein the first and second values are zero.

13. A video signal receiver according to claim 11, wherein the first and second colors are blue and red respectively, with central modulation frequencies of 4.25 MHZ and 4.406 MHZ respectively.

14. A video signal receiver according to claim 11, wherein the reference frequency is approximately 4.4 MHZ.

15. A video signal receiver according to claim 11 wherein the demodulator further comprises an adjustment circuit connected to the adjustment input of the oscillator to output an adjustment value to the adjustment input such that the voltage across the common resistor is zero when the modulation frequency of a signal applied to the second input of the phase comparator is equal to the reference frequency.

16. A video signal receiver according to claim 15, wherein the adjustment value is an adjustment current or an adjustment voltage.

17. A video signal receiver according to claim 15, further comprising:
   an adjustment circuit initialization switch, the switch being closed when the reference oscillator is connected to the second input of the phase comparator, and the switch being open when the chrominance channel is connected to the second input of the phase comparator.

18. A video signal receiver according to claim 17, wherein the adjustment circuit comprises:
   a capacitor; and
   a first transconductor amplifier outputting a current proportional to a voltage across the common resistor to fix a voltage for the capacitor when the initialization switch is closed, and a second transconductor amplifier connected between the capacitor and the adjustment input of the oscillator to output an adjustment current to the oscillator proportional to the voltage of the capacitor.

19. A video signal receiver according to claim 11, wherein the demodulator is an integrated circuit.

20. A method for demodulating a chrominance signal using a demodulator including a controlled frequency oscillator, a phase comparator connected to the oscillator, a fixed current source also connected to the oscillator, first and second output branches which comprise first and second calibration resistors respectively in series with a common resistor and a common current generator, and a current mirror, the method comprising the steps of:
   receiving a chrominance signal having a modulation frequency, at the phase comparator;
   providing a fixed current from the fixed current source;
   outputting a current equal to twice the fixed current, from the common current generator; and
   copying a current equal to the sum of the fixed current and a current at a current output of the phase comparator into the first and second output branches;
   wherein a value of the first calibration resistor is such that a first output voltage measured across the first calibration resistor is equal to a first value determined when the modulation frequency of the chrominance signal is equal to a central modulation frequency corresponding to a first color, and a value of the second calibration resistor is such that a second output voltage measured across the second calibration resistor is equal to a second value determined when the modulation frequency of the chrominance signal is equal to a central modulation frequency corresponding to a second color.

21. A method according to claim 20, wherein the first and second values are zero.

22. A method according to claim 20, wherein the first and second colors are blue and red respectively, with central modulation frequencies of 4.25 MHZ and 4.406 MHZ respectively.

23. A method according to claim 20, wherein the demodulator includes a reference oscillator, and further comprising the step of:
   connecting the external reference oscillator to the phase comparator to output a signal at a reference frequency, the reference frequency being different from first and second color modulation frequencies.

24. A method according to claim 23, wherein the reference frequency is approximately 4.4 MHZ.

25. A method according to claim 23 wherein the demodulator includes an adjustment circuit connected to the controlled frequency oscillator, and further comprising the step of:
   outputting an adjustment value from the adjustment circuit to an adjustment input of the controlled frequency oscillator such that the voltage across the common resistor is zero when the modulation frequency of the chrominance signal is equal to the reference frequency.

26. A method according to claim 25, wherein the adjustment value is an adjustment current or an adjustment voltage.

27. A method according to claim 23, wherein the demodulator includes a chrominance channel, a switch, and an adjustment circuit initialization switch, and further comprising the steps of:
   connecting the reference oscillator to the phase comparator via the switch;
   connecting the chrominance channel to the phase comparator via the switch;
   closing the adjustment circuit initialization switch when the reference oscillator is connected to the phase comparator; and
   opening the adjustment circuit initialization switch when the chrominance channel is connected to the phase comparator.

28. A method according to claim 27, wherein the adjustment circuit of the demodulator includes a capacitor, a first transconductor amplifier, and a second transconductor amplifier connected between the capacitor and an adjustment input of the controlled frequency oscillator, and further comprising the steps of:
   outputting a current, from the first transconductor amplifier, proportional to a voltage across the common resistor to fix a voltage for the capacitor when the adjustment circuit initialization switch is closed; and
   outputting an adjustment current, from the second transconductor amplifier to the controlled frequency oscillator, proportional to the voltage of the capacitor.

* * * * *